(12) United States Patent
Kotecha (10) Patent No.: US 8,320,486 B2
(45) Date of Patent: Nov. 27, 2012

(54) RETRANSMISSION METHOD FOR HARQ IN MIMO SYSTEMS

(75) Inventor: Jayesh H. Kotecha, Austin, TX (US)

(73) Assignee: Apple Inc., Cupertino, CA (US)

( * ) Notice: Subject to any disclaimer, the term of this patent is extended or adjusted under 35 U.S.C. 154(b) by 1397 days.

(21) Appl. No.: 11/864,066

(22) Filed: Sep. 28, 2007

(65) Prior Publication Data

US 2009/0304109 A1 Dec. 10, 2009

(51) Int. Cl.
*H04B 7/02* (2006.01)
(52) U.S. Cl. .................................... 375/267; 375/299
(58) Field of Classification Search .............. 375/299, 375/260, 347, 349, 148, 144
See application file for complete search history.

(56) References Cited

U.S. PATENT DOCUMENTS

| | | | |
|---|---|---|---|
| 2006/0041816 A1 | 2/2006 | Hong et al. | 714/749 |
| 2008/0086662 A1* | 4/2008 | Li et al. | 714/704 |
| 2008/0225791 A1* | 9/2008 | Pi et al. | 370/330 |
| 2009/0028264 A1* | 1/2009 | Zhang et al. | 375/267 |
| 2009/0055701 A1* | 2/2009 | Hoshino et al. | 714/748 |
| 2009/0129502 A1* | 5/2009 | Tong et al. | 375/299 |
| 2010/0027697 A1* | 2/2010 | Malladi et al. | 375/260 |
| 2010/0183057 A1* | 7/2010 | Lee et al. | 375/219 |
| 2010/0195594 A1* | 8/2010 | Seo et al. | 370/329 |

OTHER PUBLICATIONS

"Extending Codeword to Layer Mapping for Efficient Support of Retransmissions" (R1-073735) 3GPP TSG-RAN WG1 #50, Athens, Greece, Aug. 20-24, 2007.
Notes from offline discussions on PDCCH contents, Agenda Item 7.2.3, TSG-RAN WG1 #50 (R1-073870) Athens, Greece, Aug. 20-24, 2007.
"3rd Generation Partnership Project; Technical Specification Group Radio Access Network; Evolved Universal Terrestrial Radio Access (E-UTRA); Physical Channels and Modulation (Release 8)" 3GPP TS 36.211 v1.3.2 (2007).
David J. Love et al. "Multimode Preceding for MIMO Wireless Systems." In: IEEE Trans. on Signal Processing, Oct. 2005, vol. 53, No. 10, pp. 3674-3687.
International Search Report and Written Opinion regarding PCT/US2008/072111, dated Dec. 8, 2008.

* cited by examiner

*Primary Examiner* — Emmanuel Bayard
(74) *Attorney, Agent, or Firm* — Gazdzinski & Associates, PC (57) ABSTRACT

In a closed-loop wireless communication system (200), a codeword retransmission scheme is provided which allows retransmission of a single codeword using a higher order transmission rank, which may or may not be the same as the higher order transmission rank used to originally transmit the codeword. When one of a plurality of codewords (CW1, CW2) being transmitted over two codeword pipes to a receiver (**201.*i*) fails the transmission, codeword retransmission is enabled by duplicating the failed codeword at the base station (210**) and then retransmitting the duplicated codewords over both codeword pipes using the same transmission layers or "rank" as the original transmission.

33 Claims, 5 Drawing Sheets

RETRANSMISSION METHOD FOR HARQ IN MIMO SYSTEMS

BACKGROUND OF THE INVENTION

1. Field of the Invention

The present invention is directed in general to field of information processing. In one aspect, the present invention relates to a system and method for codeword retransmission within MIMO communication systems.

2. Description of the Related Art

Wireless communication systems transmit and receive signals within a designated electromagnetic frequency spectrum, but the capacity of the electromagnetic frequency spectrum is limited. As the demand for wireless communication systems continues to expand, there are increasing challenges to improve spectrum usage efficiency. To improve the communication capacity of the systems while reducing the sensitivity of the systems to noise and interference and limiting the power of the transmissions, a number of wireless communication techniques have been proposed, such as Multiple Input Multiple Output (MIMO), which is a transmission method involving multiple transmit antennas and multiple receive antennas. For example, space division multiple access (SDMA) systems can be implemented as closed-loop systems to improve spectrum usage efficiency. SDMA has recently emerged as a popular technique for the next generation communication systems. SDMA based methods have been adopted in several current emerging standards such as IEEE 802.16 and the 3rd Generation Partnership Project (3GPP) Long Term Evolution (LTE) platform.

Figure 1:
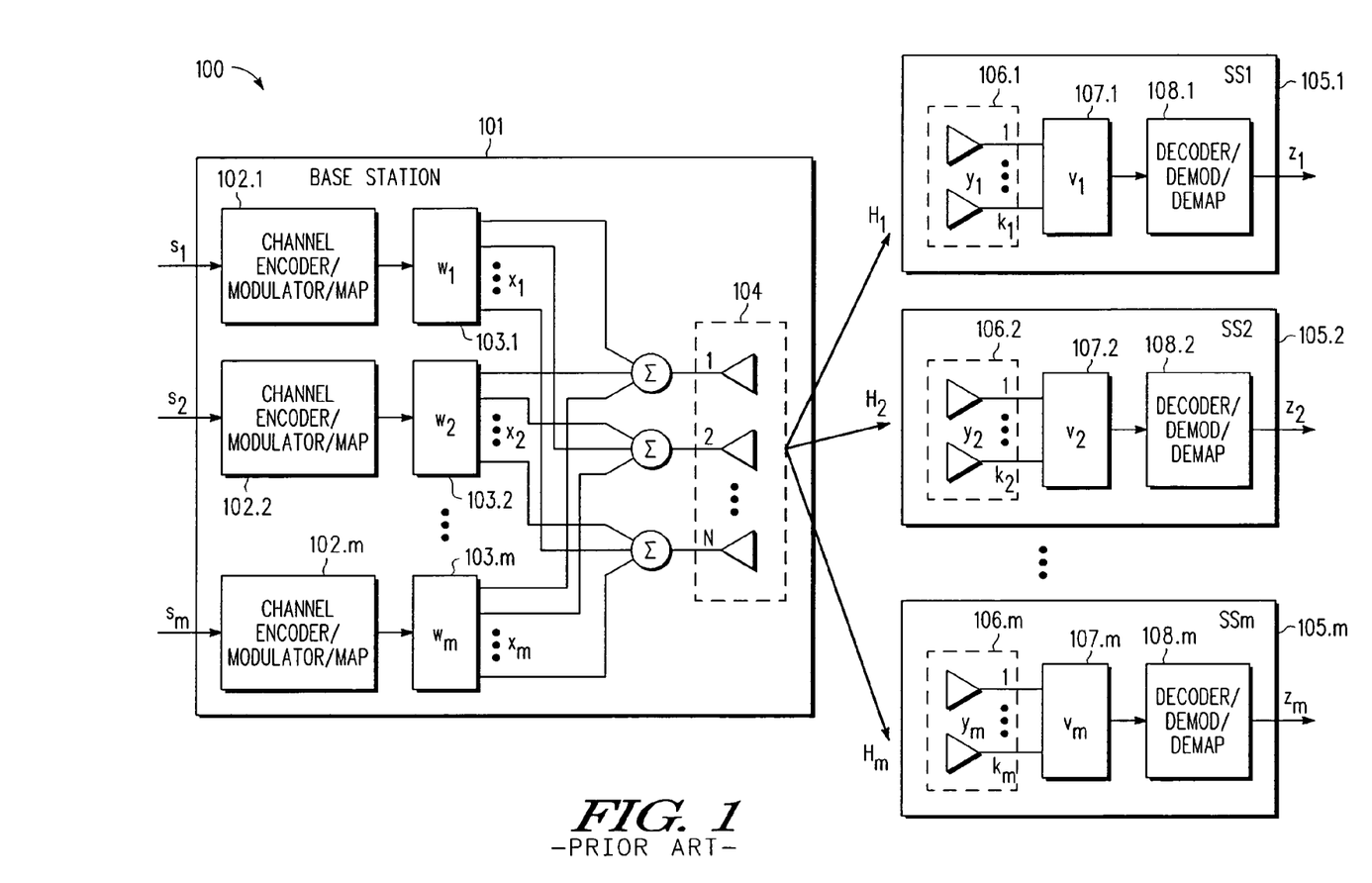
FIG. 1 (labeled prior art) depicts a wireless communication system.

Wireless communication systems, such as the example MIMO system 100 shown in FIG. 1, include one or more transmitters 101 and one or more receiver stations 105.1-105.m, where "m" is an integer representing the number of receiver stations in a given geographic area. As depicted, the transmitter 101 (e.g., base station) uses a first multiple antenna array 104 to communicate with one or more receiver stations 105.1-105.m (e.g., subscriber stations), each having its own receiver antenna array 106.i (e.g., 106.1, 106.2, ... 106.m), where each antenna array 106.i includes one or antennas. While the wireless communication system 100 may be any type of wireless communication system (including but not limited to a MIMO system, SDMA system, CDMA system, OFDMA system, OFDM system, etc.), an example MIMO wireless communication system 100 includes a transmitter 101 (which may act as a node B or base station) and one or more receivers 105.i (each of which may act as a subscriber station or user equipment), which can be virtually any type of wireless one-way or two-way communication device such as a cellular telephone, wireless equipped computer system, and wireless personal digital assistant. Of course, the receiver/subscriber station 105.i can also transmit signals which are received by the transmitter/base station 101. The signals communicated between transmitter 101 and receiver 105.i can include voice, data, electronic mail, video, and other data, voice, and video signals.

With MIMO communication systems, the transmitter 101 can use knowledge about the communication channel at each receiver 105.i to operate on the transmit signal before transmitting from the transmit antenna array 104 by using precoding techniques, thereby improving the quality and capacity of signal transmission to the subscriber stations 105.i. Precoding is implemented by applying a set of transmit beam forming or precoding weights to signals applied to each antenna in the antenna array 104 prior to transmission. For example, precoding techniques may be used to implement spatial multiplexing whereby independent and separately encoded data signals, so called streams, are transmitted from each of the multiple transmit antennas to a single subscriber station, effectively re-using or multiplexing the space dimension. With spatial multiplexing, the number of layers (or rank) simultaneously transmitted to one subscriber station (e.g., 105.1) may be adapted to match current channel characteristics. In this way, rank adaptation may exploit the potential capacity boost offered by multiple antennas when the transmission channel is rich with multipath diversity.

Examples of such precoding techniques may be understood with reference to FIG. 1, where the MIMO system base station 101 receives one or more information signals (e.g., $s_1$-$s_m$). Each information signal $s_i$ is encoded, modulated and/or mapped into transmission layers for downlink transmission by the channel encoding/modulation/mapping module 102.i, and then precoded with a precoding vector prior to transmission over the transmit antenna array 104. For example, when precoding is used to implement spatial multiplexing through multiple antennas, one or more transport blocks or codewords may be simultaneously transmitted over one or more layers to the same subscriber station (e.g., 105.1). In this context, a layer is a symbol stream originating from the modulated bits of a codeword, where a codeword refers to the coded bits of one transport block. To spatially multiplex one or more symbol streams (e.g., signal $s_1$ and $S_2$) through multiple antennas, "precoding" weights (e.g., precoding vectors $w_1$ and $W_2$) are applied to one or more symbol streams (e.g., signal $s_1$ and $S_2$) and the result (e.g., vectors $x_1$ and $x_2$) is transmitted over an array of antennas 104. (Note: lower case bold variables indicate vectors and upper case BOLD variables indicate matrices). The precoding vectors $w_i$ may be stored in a codebook (not shown) and used to direct the signal with the objective of enhancing the signal quality or performance metric, like signal-to-interference-and-noise ratio (SINR) of the received signal. In particular, the base station 101 has an array of N antennas 104, where N is an integer greater than or equal to m. The base station prepares one or more transmission signals, represented by the vector $x_i$, for each signal $s_i$, where $i \in \{1, 2, \ldots, m\}$. The transmission signal vector $x_i$ is determined in accordance with Equation [1]:

$$x_i = w_i \cdot s_i \quad [1]$$

where $w_i$, is the $i^{th}$ precoding, N dimensional transmission weight vector (also referred to as a "transmit precoder"), and each coefficient $w_j$ of weight vector $w_i$ represents a weight and phase shift on the $j^{th}$ transmit antenna 104. In addition, the term "$s_i$," is the data to be transmitted to the $i^{th}$ receiver. Each of the coefficients of weight vector $w_i$ may be a complex weight. Unless otherwise indicated, transmission precoding vectors are referred to as "weight vectors," and reception vectors are referred to as "combining vectors," though in systems having reciprocal channels (such as TDD systems), a combining vector v at a receiver/subscriber station can be used as both a combining vector (when receiving signals from a transmitter/base station) and a weighting vector (when transmitting to a transmitter/base station).

At the receiver, the received signals detected by the array of antennas 106.i are processed using the appropriate combining vectors 107.i (e.g., $v_1$ and $v_2$). For example, the transmission signal vector $x_1$ is transmitted via a channel represented by a channel matrix $H_1$, and is received at the receiver 105.1 as a receive signal vector $y_1 = H_1^H x_1 + n_1$ (where n represents noise and any co-channel interference caused by other subscriber stations). More generally, the received signals for the $i^{th}$ sub scriber station 105.$i$ are represented by a $k_i \times 1$ received signal vector $y_i$ in accordance with Equation [2]:

$$y_i = s_i^* H_i^w w_i + \left( \sum_{n=1}^{m} s_n^* H_i^H w_n - s_i^* H_i^H w_i \right) \quad [2]$$

where "$s_i$" is the data to be transmitted to the $i^{th}$ subscriber station 105.$i$, "$s_n$" is the data transmitted to the $n^{th}$ subscriber station 105.$n$, the * superscript denotes the complex conjugation operator, "$H_i^H$" represents the complex conjugate transpose of the channel matrix correlating the base station 101 and $i^{th}$ subscriber station 105.$i$, $w_i$ is the $i^{th}$ transmit weight vector, and $w_n$ is the $n^{th}$ transmit weight vector. The superscript "H" is used herein as a hermitian operator to represent a complex conjugate transpose operator. The $j^{th}$ element of the received signal vector $y_i$ represents the signal received on the $j^{th}$ antenna of subscriber station 105.$i$, $j \in \{1, 2, \ldots, k_i\}$. The first term on the right hand side of Equation [2] is the desired receive signal while the summation terms less the desired receive signal represent co-channel interference. Finally, to obtain a data signal, $z_i$, which is an estimate of the transmitted data $s_i$, the subscriber station 105.$i$ combines the signals received on the k antennas 106.$i$ using a combining vector $v_i$ 107.$i$ in accordance with Equation [3]:

$$z_i = \hat{s}_i = y_i^H v_i, \quad [3]$$

and then demaps demodulates and decodes the result with processing module 108.$i$ to obtain the data signal, $z_i$.

One difficulty associated with spatial multiplexing is the mapping of one or more codewords onto the physical layers being transmitted by the base station 101, particularly where the number of codewords and available transmit antenna ports at the transmitter can change from one base station to the next. While mapping codewords to layers may be trivial in the case of two antenna ports (since the number of layers equals the number of codewords), the mapping is more complex in the four antenna port case since there are potentially fewer codewords than layers. And even when a mapping structure is adopted, the confines of the mapping structure can create other problems for the operation of the transmitter. For example, a prescribed mapping structure may restrict the ability of the base station to efficiently retransmit signal information to a subscriber station. Accordingly, there is a need for an improved system and methodology for signal processing and control signaling in a MIMO system. There is also a need for a retransmission scheme which may be used within the prescribed mapping structures of a MIMO system. In addition, there is a need for a spatial multiplexing system and methodology which provides a codeword-to-layer mapping approach which overcomes the problems in the art, such as outlined above. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description of a preferred embodiment is considered in conjunction with the following drawings, in which.

It will be appreciated that for simplicity and clarity of illustration, elements illustrated in the drawings have not necessarily been drawn to scale. For example, the dimensions of some of the elements are exaggerated relative to other elements for purposes of promoting and improving clarity and understanding. Further, where considered appropriate, reference numerals have been repeated among the drawings to represent corresponding or analogous elements.

DETAILED DESCRIPTION

A codeword transmission system and methodology are described for use in efficiently providing codeword transmission and retransmissions in wireless multi-input, multiple output (MIMO) systems. Using codebook-based precoding techniques, spatially multiplexed transmission is enabled so that one or more codewords or transport blocks may be simultaneously transmitted over one or more layers using a predetermined codeword-to-mapping structure, such as specified by the 3GPP LTE specification TS 36.211 entitled "Physical Channels and Modulation." In instances where one of a plurality of codewords being transmitted over two codeword pipes fails the transmission, codeword retransmission is enabled by duplicating the failed codeword at the transmitter/base station and then retransmitting the duplicated codewords over both codeword pipes. In such instances, the retransmission of the duplicated codeword may be performed using the same transmission layers or "rank" as the original transmission, or may be performed using any desired higher order transmission rank that uses two or more transmission layers (e.g., rank 2, rank 3 or rank 4) that may or may not be the same as the original transmission. However, it will also be appreciated that the codeword duplication and transmission techniques disclosed herein may also be used for the original transmission of a codeword, even if there has not been a prior failure to transmit the codeword. In whatever form implemented, at least the information bits in the codeword to be transmitted over both codeword pipes are transmitted, either as duplicated codewords or by separately modulating and coding the information bits at the base station, resulting in two codewords (having identical information) that are transmitted over the two codeword pipes. In any case, control signaling may be generated by the base station/transmitter to signal the selected retransmission mode to the subscriber station/receiver and otherwise track any error control processing information. For example, the retransmission mode may be signaled by including one or more additional signaling bits in the control signal, or by re-using existing control signal information in a way that can be recognized by the subscriber station/receiver. At the subscriber station/receiver, the retransmitted codewords may be decoded and combined, such as by using a receive diversity combiner-type algorithm. With the disclosed retransmission scheme, the retransmitted codeword need not revert to a lower rank for retransmission if there are no pending codewords awaiting transmission, thereby providing a diversity advantage to improve system performance in most cases.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Figure 2:
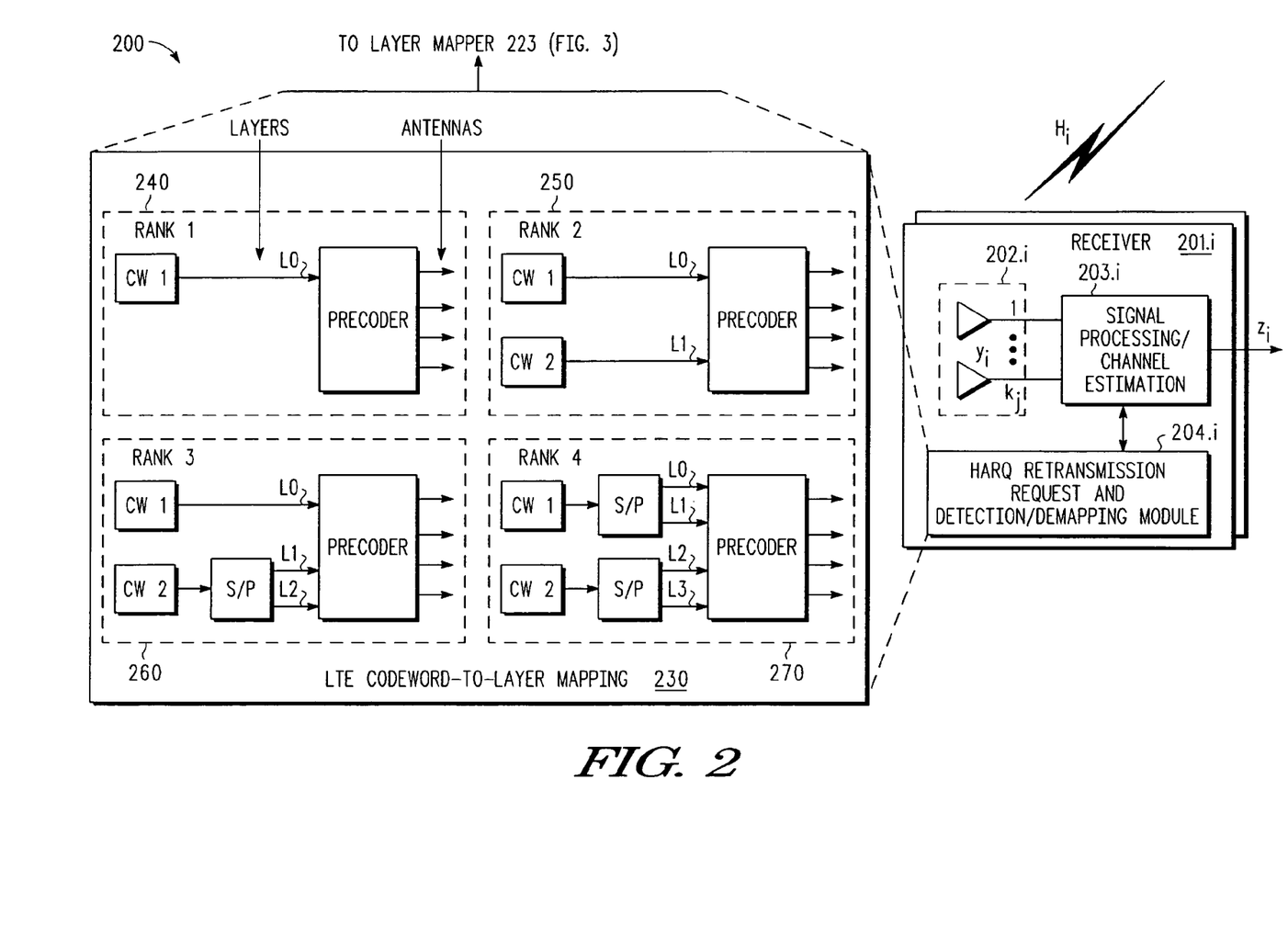
FIG. 2 depicts one or more receivers in a wireless communication system in which codeword retransmission is provided which conforms with a predetermined codeword-to-layer mapping structure.
Figure 3:
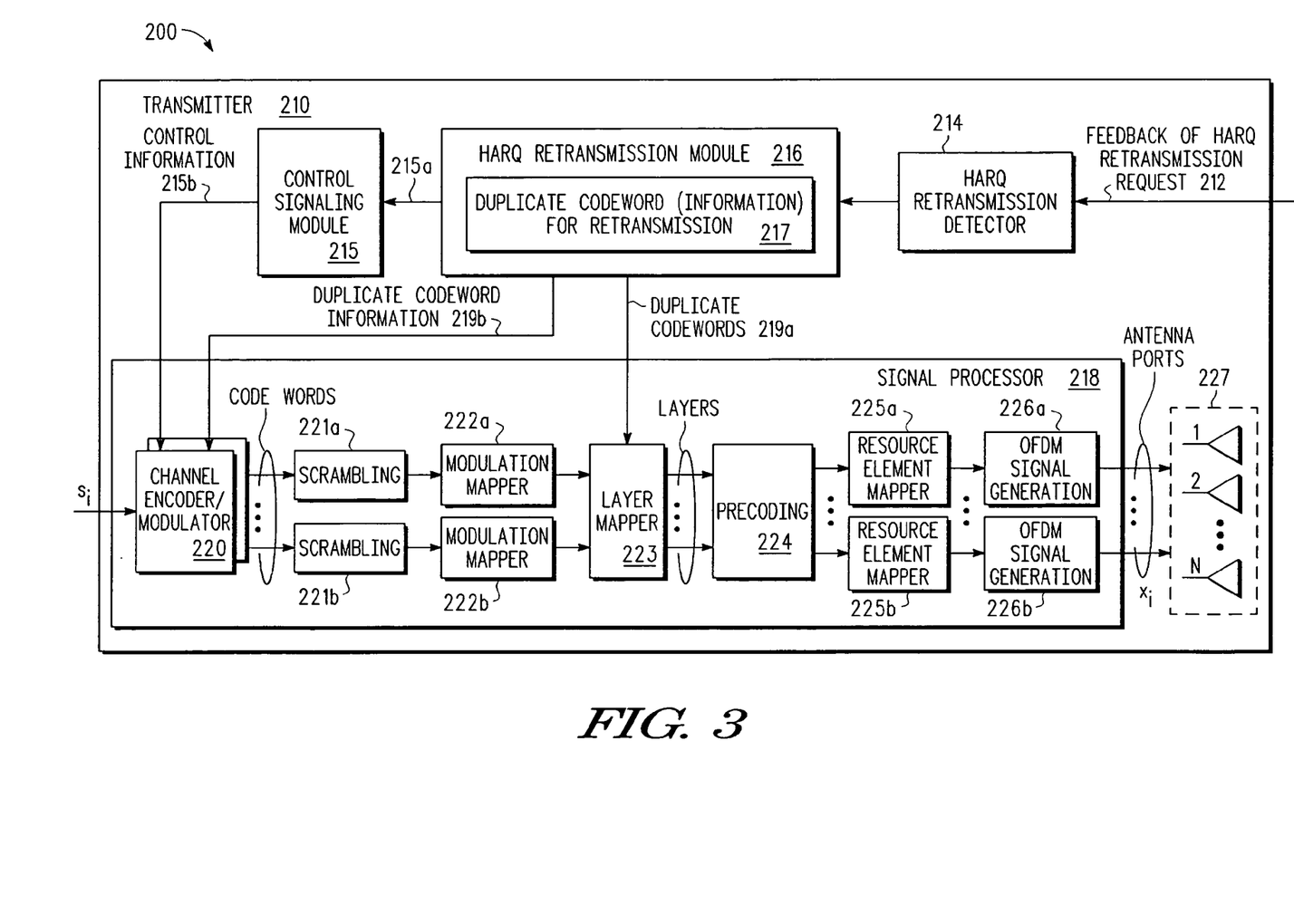
FIG. 3 depicts a transmitter in a wireless communication system in which codeword retransmission is provided which conforms with a predetermined codeword-to-layer mapping structure.

FIGS. 2 and 3 depict a wireless communication system 200 in which codeword retransmission is provided which conforms with a predetermined codeword-to-layer mapping structure. In the depicted system 200, a transmitter 210 uses codebook-based techniques to design downlink precoding vectors for precoding one or more input signals that are transmitted from a transmitter 210 (e.g., a base station) to one or more receivers 201.$i$ (e.g., subscriber stations). The transmitter 210 includes a multi-antenna array 227 for communicating with the receivers 201.$i$, each of which includes an array 202.$i$ having one or more antennas for communicating with the transmitter 210. In operation, a data signals $s_i$ presented at the transmitter 210 for transmission to the receiver 201.$i$ is transformed by the signal processor 218 into a transmission signal represented by the vector $x_i$. In accordance with the general LTE structure for downlink physical channels, signal processor 218 defines a baseband signal $x_i$ from the input data signal $s_i$ by first using an encoder/modulator 220 to perform channel encoding and modulation on the data signals $s_i$, thereby generating one or more codewords. Scrambling unit modules 221$a$, 221$b$ are then used to scramble coded bits in each of the codewords to be transmitted on a physical channel, and then modulation mapping unit modules 222$a$, 222$b$ are used to modulate the scrambled bits to generate complex-valued modulation symbols for each codeword. Next, a layer mapper unit module 223 maps the complex-valued modulation symbols for each of the codewords onto one or several layers, followed by a precoding unit module 224 which precodes the complex-valued modulation symbols on each layer for transmission on the antenna ports by mapping the transmission layer(s) onto resources on each of a plurality of transmit antenna ports. Resource element mapper modules 225$a$, 225$b$ are then used to map the complex-valued modulation symbols for each antenna port to resource elements, and orthogonal frequency division multiplex (OFDM) unit modules 226$a$, 226$b$ are used to generate complex-valued time-domain OFDM signal for each antenna port.

According to the 3GPP LTE technical specification TS 36.211 entitled "Physical Channels and Modulation," the layer mapper unit module 223 in the transmitter 210 (shown in FIG. 3) implements a predetermined codeword-to-mapping structure for mapping up to two codewords on up to four transmission layers. The LTE codeword-to-mapping structure 230 illustrated in FIG. 2 provides a mapping for the layer mapper unit module 223 (as indicated by the dashed lines to layer mapper 223 depicted in FIG. 3) which depends on the transmission rank. A single codeword is mapped to a single transmission layer (e.g., layer 0) using a rank 1 transmission structure 240. However, two codewords may be mapped to two or more layers, depending on whether the transmitter is using rank 2, rank 3 or rank 4 transmission structures. With a rank 2 transmission structure 250, a first codeword CW1 is mapped to a first transmission layer (e.g., layer 0) and a second codeword CW2 is mapped to a second transmission layer (e.g., layer 1). With a rank 3 transmission structure 260, a first codeword CW1 is mapped to a first transmission layer (e.g., layer 0), while a serial-to-parallel converter (S/P) is used to map a second codeword CW2 to second and third transmission layers (e.g., layers 1 and 2). Finally, with a rank 4 transmission structure 270, a serial-to-parallel converter is used to map a first codeword CW1 is mapped to first and second transmission layers (e.g., layers 0 and 1), while a serial-to-parallel converter is used to map a second codeword CW2 to third and fourth transmission layers (e.g., layers 2 and 3). By using higher order rank structures (e.g., rank 2, rank 3 or rank 4), the transmitter 210 is able to exploit the higher capacity allowed by having multiple antennas 227.

For a variety of reasons, there will be occasions where one or more of the transmitted codewords will not successfully pass or transmit to the receiver. As is known in the art, there are a variety of error control techniques which may be used to detect and/or correct transmission errors, or to otherwise determine that a transmission has failed. For example, Automatic Repeat-reQuest (ARQ) is an error control method for data transmission which uses acknowledgments and timeouts to achieve reliable data transmission. Another error control method is Hybrid Automatic Repeat-reQuest (HARQ) which adds error-detection (ED) bits to data to be transmitted (such as cyclic redundancy check, CRC), and also adds forward error correction (FEC) bits to the existing Error Detection (ED) bits (such as Reed-Solomon code or Turbo code). If the channel quality is bad and not all transmission errors can be corrected, the receiver will detect this situation using the error-detection code, and a retransmission is requested by the receiver.

While codeword failures can be remedied by retransmitting the failed codeword, there are situations where the retransmission of a codeword conflicts with the defined LTE codeword-to-mapping structure that may arise when the failed codeword was originally transmitted using a higher order rank transmission structure. To consider an example where a HARQ retransmission request conflicts with the defined LTE codeword-to-mapping structure, consider the case where two codewords are simultaneously transmitted using a channel rank of three or four. If the first codeword (e.g., CW1) passes but the second codeword (e.g., CW2) fails, a HARQ retransmission request 212 will be sent to the transmitter 210, requesting that the second codeword CW2 be retransmitted. In cases where the data buffer (not shown) at the transmitter 210 is empty (i.e., there are no additional data/codewords to transmit), the transmitter 210 has only the single failed codeword (e.g., CW2) to transmit. As a result, the codeword transmission originally used two layers, but for the retransmission, the only possibility provided by the defined LTE codeword-to-mapping structure is to transmit a single codeword using the rank one mapping onto a single layer. The resulting change in transmission rank limits the retransmission of the second codeword (e.g., CW2) to half as many coded bits as the original transmission, which can result in a substantial loss of coding gain as compared to the high coding rates in the first transmission. Stated more generally, if the channel rank is two or higher by the time that the second codeword is to be retransmitted, the transmitter would be forced to perform rank override, thereby increasing channel quality indicator (CQI) inaccuracy (the CQI is measured per codeword) and loss.

To address this potential conflict, selected embodiments of the present invention provide a codeword retransmission scheme whereby a failed codeword is duplicated and retransmitted using the original channel rank. To this end, each receiver 201.i includes a HARQ reception module 204.i which provides one or more receiver functions, including detecting and/or correcting errors, detecting codeword transmission failures (e.g., using HARQ error detection techniques), requesting retransmission of the failed codeword(s), detecting and demapping retransmitted codewords and newly transmitted codewords. As will be appreciated, the HARQ reception module 204.i may be implemented as part of the signal processor 203.i or with separate control logic and/or circuit functionality at the receiver 201.i to effectively request, detect and demap duplicate codewords in any desired way. For example, the HARQ reception module 204.i may include circuitry and/or control logic which is used to compare the predetermined bit fields (e.g., hybrid ARQ process number and the retransmission sequence number in the physical downlink control channel (PDCCH) downlink scheduling assignment fields) or other alternate bits in case of different signaling mechanism) to detect if a particular transmission is a retransmission event and to subsequently proceed to decoding the codewords in some diversity combining algorithm or otherwise. A transmitter 210 detects a retransmission request generated by a receiver 201.i, such as by using a HARQ retransmission detector 214. Such a detector may be implemented as part of the signal processor 218 or with separate control logic and/or circuit functionality at the transmitter 210 to detect the feedback of a HARQ retransmission request 212 from a receiver 201.i.

In response to detecting a HARQ retransmission request for a failed codeword, a HARQ retransmission module 216 at the transmitter 210 includes a codeword duplication module 217 for duplicating the codeword to be retransmitted. As will be appreciated, the codeword duplication module 217 may be implemented as part of the signal processor 218 or with separate control logic and/or circuit functionality at the transmitter 210 to effectively duplicate the failed codeword in any desired way. For example, the codeword duplication module 217 may replace the successfully transmitted codeword (e.g., CW1) with the failed codeword (e.g., CW2) and then effectively transmit the failed codeword CW2 on both codeword pipes. In this example, the duplicated codewords 219a may be provided directly to the layer mapper unit module 223. In other embodiments, the codeword duplication module 217 may duplicate the information bits from the failed codeword (e.g., CW2), but use different modulation and coding. In these embodiments, the duplicated codeword information 219b may be provided directly to the encoder/modulator 220. However duplicated, the HARQ retransmission module 216 is configured to duplicate and retransmit at least the information bits in the failed codeword over two codeword pipes.

To alert the receiver 201.i as to which retransmission mode is being used to retransmit the failed codeword, the transmitter 210 includes a control signal module 215 for generating control signaling. The control signal module 215 receives codeword retransmission information 215a from the HARQ transmission module 216 whenever codeword duplication and (re)transmission is scheduled to occur, and generates in response thereto control information 215b for baseband processing by the processor 218. As will be appreciated, the control signal module 215 may be implemented as part of the signal processor 218 or with separate control logic and/or circuit functionality at the transmitter 210 to generate a control signal that identifies the selected retransmission mode to the subscriber station/receiver and otherwise tracks any HARQ processing information. In various embodiments, the control signal may be included as one or more parameters in the PDCCH, such as the HARQ process number and the retransmission sequence number (RSN) downlink scheduling assignment fields described in the 3GPP TSG-RAN WG1 #50 R1-073870 entitled "Notes From Offline Discussions on PDCCH Contents." In this example, the HARQ process ID number field identifies which codeword is being retransmitted, while the RSN field identifies the transmission count to provide a "new data" or "redundancy" indicator. Of course, any desired control signal parameters may be used to convey the HARQ process ID number and retransmission count information to the receiver, or to convey other error control process parameters for use in control signaling of codeword transmission or HARQ retransmission specified herein. As will be appreciated, the control signal module 215 may also be used to generate control signaling to alert the receiver 201.i when an original codeword transmission is being provided over two codeword pipes.

In selected embodiments, the retransmission mode may be signaled by including one or more additional signaling bits in the control signal generated by the control signal module 215. At the receiver 201.i, the additional signaling bits are detected in the reception module 204.i and used to determine which retransmission mode is being used. To provide an example where two modes are identified by a single additional control signal bit, a first retransmission mode (e.g., the failed codeword is being duplicated and retransmitted) is signaled when the signaling bit has a first predetermined value, but a second retransmission mode (e.g., the failed codeword information is being duplicated and retransmitted) is signaled when the signaling bit has a second predetermined value. By using one or more additional signaling bits to signal how the codeword is being duplicated, it is possible to reuse control signal bits from one of the codewords for other signaling purposes. Thus, if the additional signaling bit in the control signal indicates that both codewords are identical (e.g., the same coded bits/symbols are being transmitted), then control signal bits from one of the codewords (e.g., transport block size bits, modulation coding scheme (MCS) bits, HARQ bits etc. in the second codeword) can be used for other purposes, such as storing additional information. At the receiver, this mode will be detected from the additional signaling bit, and the receiver can extract the additional information from the control signal bit fields in the other codeword.

In other embodiments, the retransmission mode may be signaled by re-using existing control signal bits in a way that can be recognized by the subscriber station/receiver. In such embodiments, the control signal generated by the control signal module 215 specifies predetermined bit field values in the control signal for two codewords to indicate that they are duplicates of one another. In an example embodiment, codeword identity is indicated if the control signals for two codewords contain the same HARQ process ID number and retransmission count in respective bit fields for both codewords. At the receiver 201.i, the reception module 204.i may be configured to determine which codewords are the same by inspecting and comparing the predetermined bit field values.

This may be done by including control logic and/or circuitry in the reception module 204.*i* that compares the predetermined bit field values, and if the HARQ process ID number and retransmission count in respective bit fields for two codewords are the same, then the receiver 201.*i* determines that a failed codeword is being retransmitted. The retransmitted codewords may then be decoded and combined, such as by using demapping module 204.*i* which uses the LTE codeword-to-mapping structure 230 to demap the retransmitted codewords (as indicated by the dashed lines to the HARQ error control module 204.*i* depicted in FIG. 2). The demapped codewords may then be decoded and combined, such as by using a receive diversity combiner-type algorithm at the signal processing module 203.*i*.

In addition to the retransmission mode, the control signal generated by the transmitter's control signal module 215 may also specify one or more parameters used in the HARQ error control process. By sending the error control process parameters to the receiver 201.*i*, both the transmitter 210 and receiver 201.*i* can track the error control process parameters. Examples of such parameters in the control signal include a HARQ process ID number and retransmission count for a failed codeword that is to be retransmitted. These parameters may be used to control the HARQ retransmission by treating the retransmission event using duplicated codewords as a single retransmission for purposes of HARQ retransmission counting and decoding. In this way, a single retransmission attempt (using duplicated codewords) is not counted twice against any limit on the retransmit attempts. Alternatively, the retransmission of a codeword may be treated as a double retransmission for purposes of HARQ retransmission counting and decoding, in which case the control signal parameters are updated accordingly by the control signal module 215.

Figure 4:
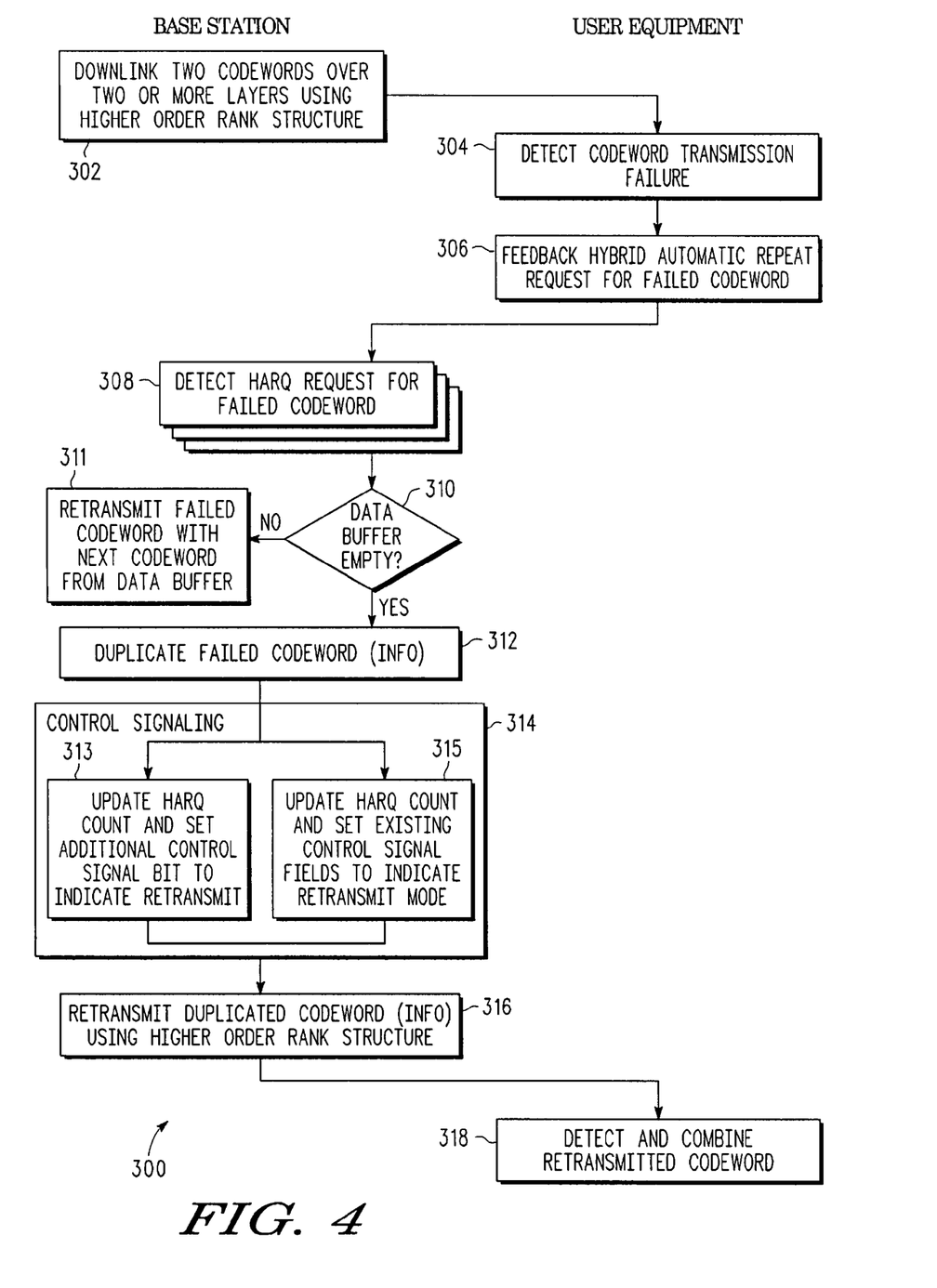
FIG. 4 depicts a first example flow for a retransmission methodology for retransmitting a failed codeword over two codeword pipes using the same higher order rank as was used in the original transmission.

FIG. 4 depicts a first example flow for a retransmission methodology 300 for retransmitting a failed codeword over two codeword pipes using any desired higher order rank, including but not limited to the same rank as was used in the original transmission. As a preliminary step, a transmitter/base station transmits two codewords over two or more transmission layers to a receiver/user equipment using a higher order rank transmission structure (step 302). In an example embodiment, the higher order rank transmission structure is selected from a predetermined codeword-to-mapping structure. When the codewords are transmitted in a MIMO communication system, the two codewords may be transmitted using the rank 3 transmission structure 260 or rank 4 transmission structure 270 defined in the LTE codeword-to-mapping structure 230 shown in FIG. 2, though it will be appreciated that the two codewords may also be transmitted using the rank 2 transmission structure 250. At the receiver/user equipment, a codeword transmission failure is detected (step 304), such as by implementing a HARQ error control scheme at the user equipment. To request retransmission of the failed codeword, the receiver/user equipment feeds back a HARQ retransmission request for the failed codeword (step 306).

At the base station, one or more HARQ retransmission requests are detected (step 308), where each HARQ retransmission request may be fed back by a different user equipment device. If there are any additional codewords in the data buffer to be transmitted to a given user equipment (negative outcome to decision 310), then the failed codeword may be retransmitted with the next codeword from the data buffer (step 311) using an appropriate higher order rank structure if supported by the channel conditions. However, if there are not any additional codewords in the data buffer to be transmitted to a given user equipment (affirmative outcome to decision 310), then at least information bits from the failed codeword are duplicated into a duplicate codeword (step 312). The duplication may be performed by generating the duplicate codeword as a copy of the failed codeword. Alternatively, the duplication may be performed by duplicating the information bits from the failed codeword and using different modulation and coding on the duplicated information bits. As a result, a first modulation and coding scheme would be used to encode the information bits into the failed codeword, and a second modulation and coding scheme would be used to encode the information bits into the duplicate codeword. As described herein, the duplicated codewords (or codeword information) are subsequently retransmitted to the user equipment at step 316 using any desired higher order rank transmission structure.

However, along with retransmitting the failed codeword, the base station must generate and send control signaling (step 314) to notify the user equipment of how the failed codeword is being retransmitted. The control signaling may be generated to update the HARQ count information for the failed codeword, and may also include an additional control signal bit that is set to indicate the retransmission mode (step 313). As indicated above, the additional control signal bit may be used to distinguish between two retransmission modes, where a first retransmission mode (e.g., the failed codeword is being duplicated and retransmitted) is signaled when the signaling bit has a first predetermined value (e.g., "0"), and a second retransmission mode (e.g., the failed codeword information is being duplicated and retransmitted) is signaled when the signaling bit has a second predetermined value (e.g., "1"). Alternatively, the control signaling may be generated to set existing control signal fields to indicate the retransmission mode (step 314). In an example embodiment, a codeword may be designated as a duplicate of another codeword if the control signals for two codewords contain the same HARQ process ID number and retransmission count in respective bit fields for both codewords.

Once the control signaling is received at the user equipment, control logic at the user equipment may be configured to detect the retransmitted codeword (step 318). Detection is enabled by using the predetermined codeword-to-mapping structure at the user equipment to extract the duplicates of the failed codeword from the higher order rank transmission structure. The duplicate codewords may also be combined at step 318, such as by using a receiver algorithm at the user equipment.

Figure 5:
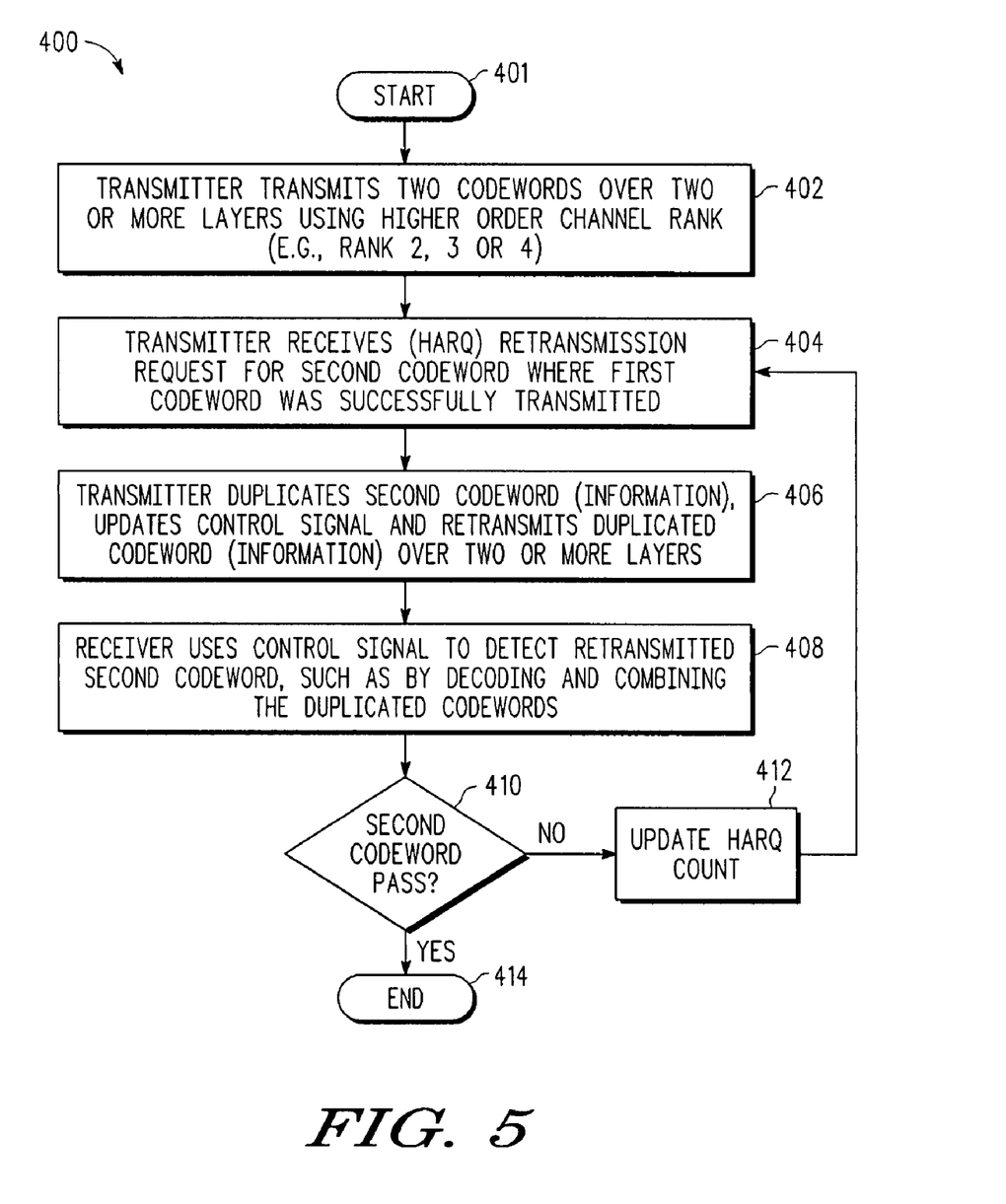
FIG. 5 depicts an example flow for performing a HARQ retransmission over two or more layers.

Selected embodiments of the present invention may also be illustrated with reference to FIG. 5, which depicts an example flow 400 for performing a HARQ retransmission over two or more layers. As depicted, the process starts (step 401) when the transmitter has information to communicate in the form of codewords over one or more downlink physical channels to one or more receivers. During this transmission mode, the transmitter simultaneously transmits two codewords over at least two transmission layers using a higher order channel rank (step 402). In accordance with selected embodiments, the higher order channel rank may be a rank 2, rank 3 or rank 4 transmission structure as defined in the LTE codeword-to-mapping structure. For example, the transmitter may use channel rank three or four during the first attempt to transmit two codewords (step 402). By using a higher order channel rank to transmit the two codewords, the transmitter spatially multiplexes the two codewords as independent and separately encoded data signals or streams.

At step 404, the transmitter receives a retransmission request for a second codeword that was not successfully transmitted where the first codeword was successfully transmitted. If, for example, the two codewords (CW1 and CW2)

were originally transmitted (at step 402) using a channel rank three so that a first codeword (CW1) was mapped to layer 0 and the second codeword (CW2) was mapped to layers 1 and 2, channel conditions may cause the second codeword (CW2) to fail transmission while the first codeword (CW1) passes. As will be appreciated, transmission failure can be caused by any of a variety of reasons, such as poor channel transmission or noise conditions. The retransmission request may be generated by a receiver as a HARQ retransmission request when the receiver's HARQ error control module determines that the transmission of the second codeword (CW2) failed, though other error control methodologies may be used to generate retransmission requests. When a HARQ retransmission request is generated and fed back to the transmitter, the receiver and transmitter both maintain error control processing parameters (e.g., HARQ process ID number and retransmission count) for the retransmission request.

At step 406, the transmitter duplicates the second (failed) codeword (e.g., CW2) or at least the information bits in the failed codeword. As will be appreciated, the codeword duplication is not required if there are any additional codewords in the data buffer to be transmitted to the receiver since the transmitter can spatially multiplex the failed codeword with the next codeword. However, if there are no additional codewords to be transmitted to the receiver, the failed codeword can be retransmitted to the receiver using a higher order rank by duplicating the failed codeword using any desired technique. In various embodiments, duplication may be performed by replacing the first codeword with the second codeword (e.g., CW1=CW2). Alternatively, the information bits from the failed codeword CW2 may be duplicated and separately modulated (e.g., with different modulation and coding on the duplicated information bits). In connection with the codeword duplication process, the transmitter generates or updates control signal information, and may retransmit duplicated codeword (information) over the same layers as originally used to transmit the two codewords (step 406), though any desired higher order layer mapping may be used. The control signal generated by the transmitter (step 406) is sent to the receiver to signal the selected retransmission mode to the receiver and otherwise track any error control processing information (e.g., HARQ process ID number and transmission count).

At step 408, the receiver uses control signal to detect the retransmitted second codeword (CW2). For example, the control signal may contain one or more additional signaling bits which are used to indicate whether the failed codeword is being retransmitted on both codeword pipes. Alternatively, existing control signal information (e.g., the HARQ process ID number and retransmission count) for two codewords may be used by the receiver to determine whether the failed codeword is being retransmitted on both codeword pipes. In this way, the receiver uses the control signal to decode and combine the duplicated codeword (information). If the second (failed) codeword is not successfully transmitted (negative outcome to decision 410), then the error control parameters (e.g., HARQ count) are updated (step 412), and another retransmission request is processed (as indicated by the feedback loop to step 404). However, if the second (failed) codeword passes (affirmative outcome to decision 410), then the retransmission process ends (step 414).

While the example sequence described with reference to FIG. 5 describes a scenario where the second codeword (CW2) fails the original transmission, it will be appreciated that the disclosed techniques may also be used when the first codeword (CW1) fails, in which the first codeword (information) is duplicated and transmitted over two or more layers. And again, while the disclosed techniques may be used when there is a codeword transmission failure, it will be appreciated that, in selected embodiments, the same codeword may be transmitted along both the codeword transmission pipes, even for a new transmission and irrespective of whether the transmitter's data buffer is empty or otherwise. This mode may be indicated in the control signaling by have identical HARQ process ID for both the codewords as well as indicating that both codewords in this transmission are new transmissions.

By now it should be appreciated that there has been provided a method and system for (re)transmitting codewords in a MIMO communication system. As disclosed, a plurality of codewords is transmitted to a receiver over at least first and second transmission layers using a first higher order transmission rank. If a first codeword is not successfully transmitted, the receiver requests that the transmitter retransmit the first codeword. At the transmitter, the request may be received as a Hybrid Automatic Repeat-reQuest (HARQ) request to retransmit the first codeword. In response, the transmitter duplicates at least information bits from the first codeword into a second codeword. The information bits may be duplicated by generating the second codeword as a copy of the first codeword, or by using separate modulation and coding schemes to encode the information bits into first and second codewords. Once duplicated, the first and second codewords are transmitted over at least two transmission layers using a second higher order transmission rank over two or more (e.g., four) transmit antennas, which may or may not be the same as the first higher order transmission rank for the original transmission. In various embodiments, the first and second codewords may be transmitted to the receiver using a rank 2, rank 3 or rank 4 transmission rank selected from an LTE codeword-to-mapping structure for mapping up to two codewords on up to four transmission layers. In connection with the retransmission of the first codeword, a control signal is generated at the transmitter to signal a retransmission mode to the receiver. The control signal may be used to track any error control processing information for retransmission of the first codeword, and/or to signal a transmission mode for the transmission of the first codeword. For example, by setting a control signal bit for the first codeword, a first transmission mode is signaled if the control signal bit has a first predetermined value, while a second transmission mode is signaled if the control signal bit has a second predetermined value. In addition or in the alternative, the control signal may be generated by writing one or more predetermined values into predetermined control signal bit fields for the first codeword and writing the same one or more predetermined values into predetermined control signal bit fields for the second codeword. The control signal may also be generated to include a transmission count parameter which is incremented, by one, once each time the first codeword is retransmitted. Alternatively, the transmission count parameter may be incremented, by one, twice each time the first codeword is retransmitted.

In another form, there is provided a method and system for transmitting transport blocks in a MIMO communication system. As disclosed, a transport block is identified that is to be transmitted to a receiver. The transport block may be identified by receiving a request from the receiver to retransmit the transport block, or by identifying a transport block to be transmitted to the receiver in an original or new transmission. The identified transport block is duplicated into first and second transport blocks. The first and second transport blocks are then transmitted to the receiver over at least first and second transmission layers using a transmit antenna array having two or more (e.g., four) transmit antennas. The transmission processing may include mapping the first and second transport blocks to at least first and second transmission layers using an LTE codeword-to-mapping structure. In addition, a control signal may be generated to signal a transmission mode to the receiver by including one or more control parameters in the physical downlink control channel. In selected embodiments, the control parameters include a transmission count parameter which is incremented once (or twice) each time the first and second transport blocks are transmitted. At the receiver, the first and second transport blocks are decoded and combined by using a receive diversity combiner-type process.

In yet another form, there is provided a method and system for using a communication device to transmit codewords in a MIMO communication system. The disclosed communication device includes a codeword duplication module for duplicating at least information bits from a first codeword into a second codeword, a layer mapping module for mapping the first codeword and second codeword onto a plurality of transmission layers, and a precoding module for mapping the plurality of transmission layers onto resources on each of a plurality of transmit antenna ports. In addition, a codeword transmission module is provided for duplicating at least information bits from the first codeword (or transport block) into a second codeword (or transport block) so that the first and second codewords (transport blocks) can be transmitted or retransmitted using a higher order transmission rank. A control signaling module may also be provided control signal is generated at the transmitter to signal a retransmission mode to the receiver. The control signal may be used to generate a control signal which may be used to track any error control processing information for retransmission of the first codeword, and/or to signal a transmission mode for the transmission of the first codeword. There is also disclosed communication device for receiving codewords in a MIMO communication system. The disclosed communication device includes a receive antenna array and a HARQ reception module which is configured for comparing predetermined bit fields in a first control signal for a first codeword with predetermined bit fields in a second control signal for a second codeword to determine if the first and second codewords are duplicates of one another. The HARQ reception module may also be configured for decoding the transmitted duplicated codeword. In various embodiments, the decoding operation is performed by decoding the duplicated codeword from the first and second codewords using a diversity combining process and a HARQ combining decoding process.

In still yet another form, there is disclosed a method and system for controlling spatial multiplexing of one or more transport blocks to a receiver by transmitting a control signal to a receiver to signal a transmission mode wherein duplicated transport blocks are transmitted. In selected embodiments, the control signal is transmitted by transmitting first and second transport block control signals, where each transport block control signal includes a retransmission sequence number and a hybrid ARQ process number. If the receiver detects that the retransmission sequence numbers and a hybrid ARQ process numbers in the first and second transport block control signals are the same, then the receiver determines that a first transport block associated with the first transport block control signal is a duplicate of a second transport block associated with the second transport block control signal. In other embodiments, the control signal control signal is transmitted by setting a control signal bit for the first transport block to signal a first transmission mode if the control signal bit has a first predetermined value and to signal a second transmission mode if the control signal bit has a second predetermined value.

The methods and systems for retransmitting codewords using the higher order rank structures as shown and described herein may be implemented in software stored on a computer-readable medium and executed as a computer program on a general purpose or special purpose computer to perform certain tasks. For a hardware implementation, the elements used to perform various signal processing steps at the transmitter (e.g., coding and modulating the data, scrambling, mapping, precoding the mapped modulated signals, preconditioning the precoded signals, duplicating and retransmitting the codewords, and so on) and/or at the receiver (e.g., recovering the transmitted signals, demodulating and decoding the recovered signals, detecting whether transmission succeeded, feeding back retransmission requests, and so on) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. In addition or in the alternative, a software implementation may be used, whereby some or all of the signal processing steps at each of the transmitter and receiver may be implemented with modules (e.g., procedures, functions, and so on) that perform the functions described herein. It will be appreciated that the separation of functionality into modules is for illustrative purposes, and alternative embodiments may merge the functionality of multiple software modules into a single module or may impose an alternate decomposition of functionality of modules. In any software implementation, the software code may be executed by a processor or controller, with the code and any underlying or processed data being stored in any machine-readable or computer-readable storage medium, such as an on-board or external memory unit.

Although the described exemplary embodiments disclosed herein are directed to various MIMO precoding systems and methods for using same, the present invention is not necessarily limited to the example embodiments illustrate herein. For example, various embodiments of a MIMO precoding system and design methodology disclosed herein may be implemented in connection with various proprietary or wireless communication standards, such as IEEE 802.16e, 3GPP-LTE, DVB and other multi-user MIMO systems. In addition, it will be appreciated that the embodiments described herein with reference to transmitting codewords from a base station to user equipment may be generalized to apply to any transmitter and receiver, or vice versa. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for retransmitting codewords in a MIMO communication system, comprising:
    transmitting a plurality of codewords to a receiver over at least first and second transmission layers;
    receiving a request from the receiver to retransmit a first codeword of the plurality of codewords;
    duplicating at least information bits from the first codeword into a second codeword; and
    transmitting the first codeword and second codeword over at least two transmission layers.

2. The method of claim 1, where transmitting the first codeword and second codeword comprises transmitting the first codeword and second codeword to a receiver using a rank 2, rank 3 or rank 4 transmission rank selected from an LTE codeword-to-mapping structure for mapping up to two codewords on up to four transmission layers.

3. The method of claim 1, where duplicating at least information bits from the first codeword into a second codeword comprises generating the second codeword as a copy of the first codeword.

4. The method of claim 1, where duplicating at least information bits from the first codeword into a second codeword comprises:
    using a first modulation and coding to encode the information bits into the first codeword; and
    using a second modulation and coding to encode the information bits into the second codeword.

5. The method of claim 1, further comprising generating a control signal at a transmitter to signal a retransmission mode to the receiver.

6. The method of claim 5, where generating a control signal comprises generating a control signal to track any error control processing and decoding information for retransmission of the first codeword.

7. The method of claim 5, where generating a control signal comprises setting a control signal bit for the first codeword to signal a first transmission mode if the control signal bit has a first predetermined value and to signal a second transmission mode if the control signal bit has a second predetermined value.

8. The method of claim 5, where generating a control signal comprises writing one or more predetermined values into predetermined control signal bit fields for the first codeword and writing the one or more predetermined values into predetermined control signal bit fields for the second codeword.

9. The method of claim 5, where generating a control signal comprises generating a transmission count parameter which is incremented, by one, once or twice each time the first codeword is retransmitted.

10. The method of claim 1, wherein the plurality of codewords does not include the second codeword.

11. A method for transmitting transport blocks in a MIMO communication system, comprising:
    detecting a change in a transmission rank comprising a mapping between transport blocks and transmission layers; and
    responsive to the detected change:
        identifying a transport block to be transmitted to a receiver;
        duplicating the transport block into first and second transport blocks; and
        transmitting the first and second transport blocks to the receiver over at least first and second transmission layers using a transmit antenna array having two or more transmit antennas.

12. The method of claim 11, where identifying the transport block to be transmitted to a receiver comprises receiving a request from the receiver to retransmit the transport block.

13. The method of claim 11, where identifying the transport block to be transmitted to a receiver comprises identifying a transport block to be transmitted to the receiver in a new transmission.

14. The method of claim 11, further comprising mapping the first and second transport blocks to at least first and second transmission layers using an LTE codeword-to-mapping structure.

15. The method of claim 11, further comprising generating a control signal to signal a transmission mode to the receiver by including one or more control parameters in a physical downlink control channel.

16. A communication device for receiving codewords in a MIMO communication system, comprising:
    a receive antenna array configured to receive a first codeword and second codeword, he first and second codewords being duplicates of one another, as a single retransmission via a plurality of transmission layers; and
    a HARQ reception module for comparing one or more predetermined bit fields in a first control signal for the first codeword with one or more predetei ined bit fields in a second control signal for the second codeword to determine if the first and second codewords are duplicates of one another, and for decoding the transmitted duplicated codeword.

17. The communication device of claim 16, where decoding the transmitted duplicated codeword comprises decoding the duplicated codeword from the first and second codewords using a diversity combining process for a new transmission or a retransmission.

18. A method for controlling spatial multiplexing of one or more transport blocks to a receiver, comprising transmitting a control signal to a receiver to signal a transmission mode wherein duplicated transport blocks are provided in a single retransmission.

19. The method of claim 18, where transmitting a control signal comprises:
    transmitting a first transport block control signal comprising a retransmission sequence number and a hybrid ARQ process number; and
    transmitting a second transport block control signal comprising a retransmission sequence number and a hybrid ARQ process number;
    whereby the retransmission sequence numbers and a hybrid ARQ process numbers in the first and second transport block control signals are identical when a first transport block associated with the first transport block control signal comprises a duplicate of a second transport block associated with the second transport block control signal.

20. The method of claim 18, where transmitting a control signal comprises setting a control signal bit for the first transport block to signal a first transmission mode if the control signal bit has a first predetermined value and to signal a second transmission mode if the control signal bit has a second predetermined value.

21. The method of claim 18, where transmitting a control signal comprises generating a transmission count parameter in the control signal which is incremented by one, once or twice, each time the duplicated transport blocks are provided in a single retransmission.

22. Apparatus for retransmitting codewords in a MIMO communication system, comprising:
    first apparatus configured to transmit a plurality of codewords to a receiver over at least first and second transmission layers;
    second apparatus configured to receive a request from the receiver to retransmit a first codeword;
    third apparatus configured to duplicate at least information bits from the first codeword into a second codeword; and
    fourth apparatus configured to cause retransmission of the first codeword and second codeword over at least two transmission layers as a single retransmission.

23. The apparatus of claim 22, where the single retransmission of the first codeword and second codeword comprises retransmission of the first codeword and second codeword to a receiver using a rank 2, rank 3 or rank 4 transmission rank selected from an LTE codeword-to-mapping structure for mapping up to two codewords on up to four transmission layers.

24. The apparatus of claim 22, where the third apparatus further comprises apparatus configured to generate the second codeword as a copy of the first codeword.

25. The apparatus of claim 22, where the third apparatus further comprises:
    apparatus configured to encode, using a first modulation and coding, the information bits into the first codeword; and
    apparatus configured to encode, using a second modulation and coding, the information bits into the second codeword.

26. The apparatus of claim 22, further comprising a fifth apparatus configured to generate a control signal at the apparatus for retransmitting codewords to signal a retransmission mode to the receiver.

27. The apparatus of claim 26, where the generation of a control signal comprises generation of a control signal to track any error control processing and decoding information for the single retransmission of the first codeword.

28. The apparatus of claim 26, where the generation of a control signal comprises signaling a first transmission mode if a control signal bit has a first predetermined value, and signaling a second transmission mode if the control signal bit has a second predetermined value.

29. The apparatus of claim 26, where the generation of a control signal comprises writing one or more predetermined values into predetermined control signal bit fields for the first codeword, and writing the one or more predetermined values into predetermined control signal bit fields for the second codeword.

30. The apparatus of claim 26, where the generation of a control signal comprises generation of a transmission count parameter which is incremented, by one, once or twice each time the first codeword is retransmitted.

31. The apparatus of claim 22, wherein the first apparatus further comprises a precoding apparatus configured to:
    receive the plurality of codewords comprising a plurality of data symbols; and
    generate at least a first and second data streams using the data symbols;
    wherein:
        the first data stream corresponds to a first transmission layer of the at least two transmission layers; and
        the second data stream corresponds to a second transmission layer of the at least two transmission layers.

32. Mobile wireless apparatus for retransmitting codewords in a MIMO communication system, comprising:
    first apparatus configured to transmit a plurality of codewords to a receiving apparatus over at least first and second transmission layers;
    second apparatus configured to receive a request from the receiving apparatus to retransmit a first codeword;
    third apparatus configured to duplicate at least information bits from the first codeword into a second codeword; and
    fourth apparatus configured to cause retransmission of the first codeword and second codeword over at least two transmission layers as a single retransmission.

33. A method for transmitting transport blocks in a MIMO communication system, comprising:
    detecting a change in a transmission rank comprising a mapping between transport blocks and transmission layers; and
    responsive to the detected change:
        identifying a transport block to be transmitted to a receiver;
        duplicating the transport block into first and second transport blocks; and
        transmitting the first and second transport blocks to the receiver over at least first and second transmission layers using a transmit antenna array having two or more transmit antennas;
    wherein the act of detecting a change in the transmission rank comprises:
        detecting a first number of transport blocks associated with a first transmission;
        detecting a number of symbol streams comprising data symbols within the first number of transport blocks of the first transmission, the number of symbol streams comprising at least a first and a second symbol stream; and
        detecting a second number of transport blocks, the second number of transport blocks being smaller than the first number of transport blocks; and
    wherein:
        the first data stream corresponds to the first transmission layer;
        the second data stream corresponds to the second transmission layer; and
        the act of transmitting the first and second transport blocks to the receiver over at least first and second transmission layers comprises a second transmission, the second transmission configured to maintain the number of symbol streams comprising data symbols within the first number of transport blocks of the first transmission.

* * * * *